United States Patent [19]

Bortolin et al.

[11] Patent Number: 4,866,153
[45] Date of Patent: Sep. 12, 1989

[54] CYCLIC SILETHYNYL POLYMERS AND A METHOD FOR MAKING THEM

[75] Inventors: Roberto Bortolin; Bhukandas Parbhoo, both of Sussex, United Kingdom

[73] Assignee: Dow Corning, Ltd., Barry, Wales

[21] Appl. No.: 295,703

[22] Filed: Jan. 9, 1989

Related U.S. Application Data

[62] Division of Ser. No. 179,016, Apr. 8, 1988, abandoned.

[30] Foreign Application Priority Data

Apr. 16, 1987 [GB] United Kingdom ............... 8709296

[51] Int. Cl.$^4$ .................................................. C08G 77/20
[52] U.S. Cl. .................................... 528/32; 556/406; 556/478; 526/279
[58] Field of Search ............... 556/478, 406; 526/279; 528/32

[56] References Cited

U.S. PATENT DOCUMENTS 3,699,140 10/1972 Chandra et al. ..................... 528/32

Primary Examiner—Paul R. Michl
Assistant Examiner—Alex H. Walker
Attorney, Agent, or Firm—James E. Bittell

[57] ABSTRACT

Cyclic silethynyl polymers, having at least 4 silicon atoms per polymer, have the average formula

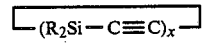

Preferably x has a value of 5 or 6, and each R is independently methyl or phenyl. They are prepared by reacting a lithium salt of one or more diehtynylsilanes with one or more dihalosilanes. These polymers are useful for example in semi- or photoconductive applications.

4 Claims, No Drawings

CYCLIC SILETHYNYL POLYMERS AND A METHOD FOR MAKING THEM

This is a divisional of co-pending application Ser. No. 179,016 filed on Apr. 8, 1988, now abandoned.

This invention relates to novel cyclic polymers and to a method for making these compounds.

Acyclic silethynyl polymers having repeating units of the general formula —($R_2SiC\equiv C$)—, wherein R may be a saturated, ethylenically unsaturated or aromatic hydrocarbon group have been described in British Patent Specification No. 914 935, according to which they can be prepared by reacting an organodifluoro silane with an alkali metal acetylide. A single cyclic silethynyl polymer having the formula $[(CH_3)_2Si-C\equiv C)]_3$ has been reported in Chemistry Letters 1984, page 596. This product was obtained via a stepwise extraction of dimethylsilylene from dodecamethyl-3,4,7,8,11,12-hexasilacyclododeca-1,5,9-triyne, yielding at 540° C. only 11% of the cyclic silethynyl compound, while reaction at 690° C. yields 68%. Preparation of the starting material for this reaction is a very complex reaction in itself.

We have now found that cyclic silethynyl compounds which have at least 4 silicon atoms in the ring can be prepared. We have also found that they can be obtained in high yields even at relatively low temperatures.

This invention accordingly provides cyclic silethynyl polymers of the general formula

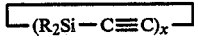

wherein each R is independently selected from hydrogen and a member of the group consisting of alkyl, aryl, alkenyl, substituted alkyl, substituted aryl and substituted alkenyl each having from 1 to 18 carbon atoms, and x denotes an integer of at least 4.

In the general formula of the cyclic silethynyl polymers of the invention x may have a value of up to 25 or more but is preferably 5 or 6. The R substituents may be hydrogen, alkyl, for example methyl, ethyl, hexyl, dodecyl or octadecyl, aryl, for example phenyl or naphtyl, alkenyl, for example vinyl, allyl or hexenyl, or substituted groups, such as halogenated alkyl, tolyl or styryl. Preferably the R substituents are alkyl or aryl, most preferably methyl or phenyl. Each R substituent of the polymer may be different from or the same as some or all of the other R substituents.

The cyclic silethynyl polymers of the invention may be produced by reacting a diethynylsilane lithium compound with a dihalosilane. This method gives good yields of the cyclic silethynyl polymers.

The present invention accordingly includes a method of making a cyclic silethynyl polymer of the general formula

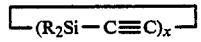

wherein each R is independently selected from hydrogen and a member of the group consisting of alkyl, aryl, alkenyl, substituted alkyl, substituted aryl and substituted alkenyl each having from 1 to 18 carbon atoms, and x denotes an integer of at least 4 by reacting (A) a lithium salt of at least one diethynylsilane of the general formula $R_2Si(C\equiv CH)_2$, wherein each R is as defined above, with (B) at least one dihalosilane of the general formula $R'_2SiX_2$, wherein each R' is as defined for R above and X denotes a halogen atom.

Reactant (A) is a compound of the general formula $R_2Si(C\equiv CLi)_2$ and can be prepared by reacting one or more diethynylsilanes with an alkyllithium compound, for example butyl lithium. Such reaction is carried out by mixing the ingredients and is preferably carried out in the presence of a solvent comprising for example tetrahydrofuran, aromatic hydrocarbon, aliphatic hydrocarbon or an ether solvent. Diethynylsilanes may themselves be obtained for example by reacting a dialkyldihalosilane of the general formula $R_2SiCl_2$ with $HC\equiv CMgCl$ in tetrahydrofuran.

The dihalosilane reactants (B) are known substances, many of which are commercially available. Preferably the dihalosilane is a dichlorosilane. The other substituents of the silane may be hydrogen, alkyl, for example methyl, ethyl, hexyl, qodecyl or octadecyl, aryl, for example phenyl or naphthyl alkenyl, for example vinyl, allyl or hexenyl, or substituted groups, such as halogenated alkyl, tolyl or styryl. Preferably the R' substituents are alkyl or aryl. The most preferred dihalosilanes are dimethyldichlorosilane, diphenyldichlorosilane and methylphenyldichlorosilane.

This reaction is preferably carried out in the presence of a solvent. The solvent may be the same or different from the solvent used in the production of reactant (A), and the reaction can advantageously be carried out immediately after producing the lithium salts of diethynylsilanes according to the method described above.

The temperature at which reaction between (A) and (B) is carried out is not critical. The reaction may be carried out at or below ambient temperature or at elevated temperatures. Preferably the reaction is performed at a temperature in the range from about 15° to 30° C. The method of the invention can provide yields as high as 90% or more of the theoretical value of cyclic silethynyl polymers, even when the reactions are carried out at ambient temperature (that is about 20° C.). If desired the reaction time may be reduced by the use of elevated temperatures.

When the reaction is complete, the polymers of the invention may be recovered from the reaction mixture for example by precipitation in an alcohol such as methanol, followed by filtration or solvent evaporation.

Each unit of the cyclic polymer thus obtained may be the same or different from the other units, depending on the choice of silanes used in the method. For example the reaction of the lithium salt of dimethyldiethynylsilane with methylphenyldichlorosilane, will result in a cyclic silethynyl polymer having some units with two methyl substituents and some with a methyl and a phenyl substituent. However, these units will not necessarily alternate, indicating that some rearrangement of the substituents may occur during the reaction of the method of the invention. Thus by choosing the reagents appropriately, a whole range of homopolymers and copolymers may be produced. The polymers thus obtained tend to be solid materials at ambient temperatures under atmospheric pressure (760 mm Hg).

Cyclic silethynyl polymers of this invention have useful optical and electronic properties arising from their electron-rich nature. The polymers may be used for example as semiconductors, as photoconductors or in waveguide technology. Due to the presence of the acetylenic unsaturation, the polymers may also be further reacted, for example by the addition reaction with compounds having silicon-bonded hydrogen atoms. Such compounds may bear certain functional groups which would thus be linked to the polymers of this invention.

The following examples, where all parts and percentages are expressed by weight and where Me, Vi, Bu and Ph denote respectively a methyl, vinyl, butyl and phenyl group, illustrate the invention.

ILLUSTRATIVE METHOD

To a solution of $R^1R^2$—Si—(C≡C)$_2$ (12.9 mmole) in 100 ml of tetrahydrofuran (thf), cooled in dry ice, 9 ml of a 2.9 molar solution of BuLi in hexane was added. After 1 hour of stirring at ambient temperature a solution of $R^3R^4$—Si—Cl$_2$ (12.9 mmole) in 50 ml of thf was slowly added. The solution was stirred for 4 hours at ambient temperature and the thf was stripped of under reduced pressure. To the residue 50 ml of toluene were added and LiCl was filtered out. The toluene solution was poured in 500 ml of methanol to give a white precipitate. The polymer was collected by filtration and washed with methanol which was subsequently evaporated. Polymers of the general structure

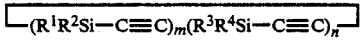

were obtained. Polymers obtained after washing with methanol showed no NMR (Nuclear Magnetic Resonance) signals due to end groups, indicating that pure cyclic polymers can be isolated.

ILLUSTRATIVE POLYMERS

Polymers obtained by using the illustrative method, had the general formula

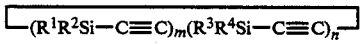

The denotations for $R^1$, $R^2$, $R^3$, $R^4$ and the yield for each reaction are given in Table I. A range of cyclic materials was formed, the value for m+n ranging from 4 to 25.

TABLE I

| Example | $R^1$ | $R^2$ | $R^3$ | $R^4$ | Yield |
|---|---|---|---|---|---|
| 1 | Me | Me | Me | Me | 95% |
| 2 | Ph | Ph | Ph | Ph | 93% |
| 3 | Me | Ph | Me | Ph | 85% |
| 4 | Me | Me | Ph | Ph | 91% |
| 5 | Me | Me | Me | Ph | 80% |
| 6 | Me | Ph | Me | Ph | 90% |
| 7 | Me | Me | Me | H | 85% |
| 8 | Ph | Ph | Me | H | 90% |
| 9 | Vi | Me | Ph | Ph | 93% |
| 10 | Vi | Me | Ph | Me | 85% |

The compounds were characterized by HPLC (High Permeation Liquid Chromatography), [29]and $^{13}$C NMR (Nuclear Magnetic Resonance) and TGA (Thermo Gravimetric Analysis). The reaction product in each Example was a mixture of cyclic compounds having differing numbers of silicon atoms. Thus in Example 1 the product contained cyclic species having up to 24 silicon atoms. The product of Example 2 consisted of a mixture of cyclics having from 4 to 19 silicon atoms.

That which is claimed is:

1. A method of making a cyclic silethynyl polymer of the general formula

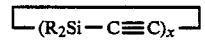

wherein each R is independently selected from hydrogen and a member of the group consisting of alkyl, aryl, alkenyl, substituted alkyl, substituted aryl and substituted alkenyl each having from 1 to 18 carbon atoms, and x denotes an integer of at least 4 by reacting (A) a lithium salt of at least one diethynylsilane of the general formula R$_2$Si(C≡CH)$_2$, wherein each R is as defined above, with (B) at least one dihalosilane of the general formula R'$_2$SiX$_2$, wherein each R' is as defined for R above and X denotes a halogen atom.

2. A method according to claim 1, wherein the reaction is carried out at temperatures in the range from about 15° to about 30° C.

3. A method according to claim 1 wherein the reaction is carried out in the presence of a solvent.

4. A method according to claim 2 wherein the solvent comprises tetrahydrofuran.

* * * * *

UNITED STATES PATENT AND TRADEMARK OFFICE
CERTIFICATE OF CORRECTION

PATENT NO. : 4,866,153
DATED : 9/12/89
INVENTOR(S) : Roberto Bortolin and Bhukandas Parboo It is certified that error appears in the above—identified patent and that said Letters Patent is hereby corrected as shown below:

In Column 3, line 12-13, ""$R^1R^2-Si-(C \equiv C)_2$"" should read --$R^1R^2-Si-(C \equiv CH)_2$--.

In Column 4, line 14, ""$^{29}$"" should read --$^{29}Si$--.

Signed and Sealed this

Thirtieth Day of October, 1990

*Attest:*

HARRY F. MANBECK, JR.

*Attesting Officer*    *Commissioner of Patents and Trademarks*